US009323419B2

(12) United States Patent
Morikawa et al.

(10) Patent No.: US 9,323,419 B2
(45) Date of Patent: Apr. 26, 2016

(54) INPUT APPARATUS

(71) Applicant: DENSO CORPORATION, Kariya, Aichi-pref. (JP)

(72) Inventors: Shohei Morikawa, Ichinomiya (JP); Takeshi Kawashima, Nisshin (JP); Hirotaka Goto, Nagoya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 485 days.

(21) Appl. No.: 13/705,850

(22) Filed: Dec. 5, 2012

(65) Prior Publication Data

US 2013/0152023 A1 Jun. 13, 2013

(30) Foreign Application Priority Data

Dec. 7, 2011 (JP) ................. 2011-268149

(51) Int. Cl.
*G06F 3/048* (2013.01)
*G06F 3/0481* (2013.01)

(52) U.S. Cl.
CPC ................. *G06F 3/04812* (2013.01)

(58) Field of Classification Search
CPC ........ G06F 3/048; G06F 3/00; G06F 3/04817
See application file for complete search history.

(56) References Cited

U.S. PATENT DOCUMENTS

| 6,760,049 | B1 * | 7/2004 | Todd ............................. 715/813 |
| 8,407,608 | B1 * | 3/2013 | Franklin et al. ............... 715/759 |
| 2009/0249257 | A1 * | 10/2009 | Bove et al. .................... 715/858 |
| 2010/0255907 | A1 | 10/2010 | Yoro |
| 2010/0271301 | A1 | 10/2010 | Ohshita et al. |
| 2010/0283753 | A1 | 11/2010 | Ohshita |
| 2012/0017182 | A1 * | 1/2012 | Bau ............................... 715/859 |

FOREIGN PATENT DOCUMENTS

| JP | 8-152971 | 9/1996 |
| JP | 8-249109 | 9/1996 |
| JP | 9-190287 | 7/1997 |
| JP | 2004-245682 | 9/2004 |
| JP | 2006-029917 | 2/2006 |
| JP | 2006-244393 | 9/2006 |
| JP | 2007-058426 | 3/2007 |
| JP | 2010-117841 | 5/2010 |
| JP | 2010-257075 | 11/2010 |
| JP | 2010-257076 | 11/2010 |

* cited by examiner

*Primary Examiner* — Rashawn Tillery
(74) *Attorney, Agent, or Firm* — Harness, Dickey & Pierce, P.L.C.

(57) ABSTRACT

An input apparatus includes a display unit, an input unit, and a control unit. The display unit displays function items on a display window. The input unit selects and determines one function item with a pointer. The control unit controls a movement of the pointer by setting coordinates of the pointer based on position information transmitted from the input unit. Each function item includes a button region and a selection region. When the pointer moves to one of the button region and the selection region, the function item is selected. When the pointer is set to an equivalent stop state in the selection region, coordinates of the pointer are set as coordinates of a stop state position. When the pointer is set to the equivalent stop state in the button region, the coordinates of the pointer are set as coordinates of a predetermined position of the button region.

17 Claims, 8 Drawing Sheets

INPUT APPARATUS

CROSS REFERENCE TO RELATED APPLICATION

This application is based on Japanese Patent Application No. 2011-268149 filed on Dec. 7, 2011, the disclosure of which is incorporated herein by reference.

TECHNICAL FIELD

The present disclosure relates to an input apparatus in which a function item displayed on a display unit is selected by a predetermined selection manipulation and determined by a predetermined determination manipulation.

BACKGROUND

Conventionally, an input apparatus, which is disclosed in JP 2006-244393 A is well known. The input apparatus disclosed in JP 2006-244393 A includes a display unit, and an input unit. The display unit displays multiple function items. The input unit selects one of the function items by moving a virtual pointer on a display window based on a predetermined selection manipulation, which is performed by a user on a surface of the input unit, and determines the selected function item based on a predetermined determination manipulation, which is performed by the user on the surface of the input unit.

The predetermined selection manipulation is a manipulation performed by the user with a finger on the surface of the input unit to select the function item. Specifically, a pointer moves based on a slide of the finger on the surface of the input unit, and selects the function item. The predetermined determination manipulation is a manipulation performed by the user with the finger on the surface of the input unit to determine the selected function item. Specifically, the selected function item is determined based on a press on the surface of the input unit with the finger.

Each function item has a button shape, and the button shape of each function item includes a selection region and a boundary region. The selection region is arranged at a center of an entire region of the button shape, and the boundary region is arranged so that the boundary region surrounds the selection region within the entire region of the button shape. In the input apparatus disclosed in JP 2006-244393 A, when the pointer enters the boundary region of the function item and stops moving for a predetermined time, the pointer is controlled to move to a center position of the selection region of the function item.

With above-described configuration, when the pointer is positioned in the boundary region of the function item and the user stops a slide of the finger on the surface of the input unit for the predetermined time, the pointer is controlled to move to the center position of the selection region of the function item. Thus, the function item is determined with certain thereby reducing a wrong input even when the pointer is displaced due to a shake of the finger during performing the predetermined determination manipulation by pressing the function item.

In the input apparatus disclosed in JP 2006-244393 A, when the user selects a target function item, which is arranged apart from a currently selected function item, the user needs to slide the finger on the surface of the input unit from the currently selected function item to the target function item passing through non-target function items positioned between the currently selected function item and the target function item. During a movement from the currently selected function item to the target function item, when the user repeatedly stops within or near the non-target function items, the pointer is controlled to moved to an inside portion of a corresponding non-target function item. Thus, the pointer is displaced from a route from the currently selected function item to the target function item and selects a non-target function item finally. Thus, in this case, a wrong function item other than the target item is selected. Under this state, when the predetermined determination manipulation is performed, the wrong function item other than the target function item is determined. Thus, with above-described configuration, a wrong input occurs finally.

SUMMARY

In view of the foregoing difficulties, it is an object of the present disclosure to provide an input apparatus, which reduces a wrong input during a predetermined determination manipulation to a subject function item.

According to a first aspect of the present disclosure, an input apparatus includes a display unit, an input unit, and a control unit. The display unit displays a plurality of function items on a display window of the display unit. Each function item has a button shape. The input unit selects one of the function items and determines the one of the function items with a pointer. The pointer moves in the display window to select the one of the function items based on a predetermined selection manipulation and determines the one of the function items based on a predetermined determination manipulation. The one of the function items selected and determined by the pointer is referred to as a subject function item. The control unit controls a movement of the pointer in the display window by setting coordinates of the pointer based on position information of the pointer. The position information is transmitted from the input unit. Each of the function items includes a button region, which is defined at an inside region of an outline of the button shape, and a selection region, which is defined around the button region at an outside region of the outline of the button shape. The subject function item includes a subject button region and a subject selection region. When the pointer moves to at least one of the subject button region and the subject selection region of the subject function item, the subject function item is selected. When the pointer is set to an equivalent stop state in the subject selection region, the control unit sets the coordinates of the pointer in the display window as coordinates of a position at which the pointer is set to the equivalent stop state. The position at which the pointer is set to the equivalent stop state is referred to as a stop state position, and the equivalent stop state refers to a state in which the pointer moves at a speed lower than a predetermined speed. When the pointer is set to the equivalent stop state in the subject button region, the control unit sets the coordinates of the pointer in the display window as coordinates of a predetermined position of the subject button region.

In the above apparatus, a wrong input during the predetermined determination manipulation to the subject function item is reduced.

According to a second aspect of the present disclosure, an input apparatus includes a display unit, an input unit, and a control unit. The display unit displays a plurality of function items on a display window of the display unit. Each function item has a button shape. The input unit selects one of the function items and determines the one of the function items with a pointer. The pointer moves in the display window to select the one of the function items based on a predetermined selection manipulation, and determines the one of the function items based on a predetermined determination manipulation. The one of the function items selected and determined by the pointer is referred to as a subject function item. The control unit controls a movement of the pointer in the display window by setting coordinates of the pointer based on position, information of the pointer. The position information is transmitted from the input unit. When the pointer is set to the equivalent stop state, the control unit defines a lock region based on a reference position, which is the stop state position. When the pointer moves again from the stop state position to a destination position, which is positioned inside of the lock region, the control unit resets the coordinates of the pointer in the display window as coordinates of the reference position of the lock region. When, the pointer moves again from the stop state position to a destination position, which is positioned outside of the lock region, the control unit resets the coordinates of the pointer in the display window as coordinates of the destination position.

In the above apparatus, a wrong input during the predetermined determination manipulation to the subject function item is reduced.

According to a third aspect of the present disclosure, an input apparatus includes a display unit, an input unit, and a control unit. The display unit displays a plurality of function items on a display window of the display unit, each function item has a button shape. The input unit selects one of the function items and determines the one of the function items with a pointer. The pointer moves in the display window to select the one of the function items based on a predetermined selection manipulation, and determines the one of the function items based on a predetermined determination manipulation. The one of the function items selected and determined by the pointer is referred to as a subject function item. The control unit controls a movement of the pointer in the display window by setting coordinates of the pointer based on position information of the pointer. The position information is transmitted from the input unit. The function items are arranged in contact with one another. Each of the function items includes a button region, which is defined at an inside region of an outline of the button shape, and the button region includes an inside region, which is defined at an inside region of the button region. The subject function item includes a subject button region and a subject inside region. When the pointer moves to at least one of the subject button region and the subject inside region of the subject function item, the subject function item is selected. When the pointer is set to the equivalent stop state in the subject button region other than the subject inside region, the control unit sets the coordinates of the pointer in the display window as coordinates of the stop state position. When the pointer is set to the equivalent stop state in the subject inside region, the control unit sets the coordinates of the pointer in the display window as coordinates of a predetermined position of the subject button region.

In the above apparatus, a wrong input during the predetermined determination manipulation to the subject function item is reduced.

According to a fourth aspect of the present disclosure, an input apparatus for selecting one of a plurality of function items includes an input unit and a control unit. Each of the function items has a button shape and is displayed on a display window of a display unit. The input unit selects the one of the function items and determines the one of the function items with a pointer. The pointer moves in the display window to select the one of the function items based on a predetermined selection manipulation and determines the one of the function items based on a predetermined determination manipulation. The one of the function items selected and determined by the pointer is referred to as a subject function item. The control unit controls a movement of the pointer in the display window by setting coordinates of the pointer based on position information of the pointer. The position information is transmitted from the input unit. Each of the function items includes a button region, which is defined at an inside region of an outline of the button shape, and a selection region, which is defined around the button region at an outside region of the outline of the button shape. The subject function item includes a subject button region and a subject selection region. When the pointer moves to at least one of the subject button region and the subject selection region of the subject function item, the subject function item is selected. When the pointer is set to an equivalent stop state in the subject selection region, the control unit sets the coordinates of the pointer in the display window as coordinates of a position at which the pointer is set to the equivalent stop state. The equivalent stop state refers to a state in which the pointer moves at a speed lower than a predetermined speed, and the position at which the pointer is set to the equivalent stop state is referred to as a stop state position. When the pointer is set to the equivalent stop state in the subject button region, the control unit sets the coordinates of the pointer in the display window as coordinates of a predetermined position of the subject button region.

In the above apparatus, a wrong input during the predetermined determination manipulation to the subject function item is reduced.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
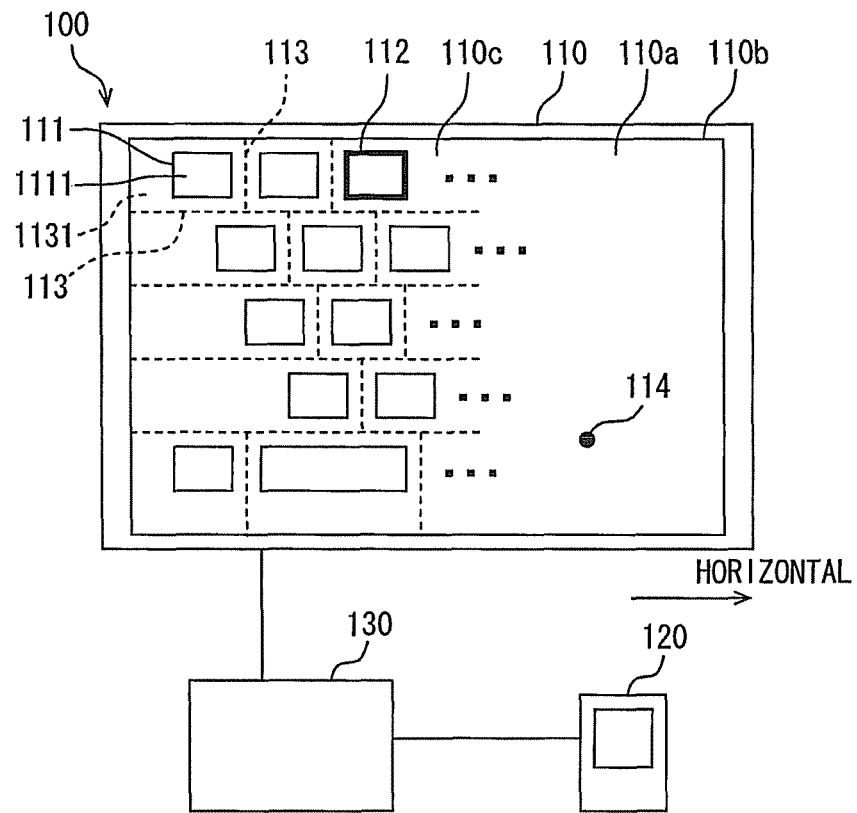
FIG. 1 is a block diagram showing a configuration of an input apparatus according to the present disclosure.

The following will describe embodiments of the present disclosure with reference to the drawings. In each of the following embodiments, the same reference number is added to the same or equivalent parts in the drawings. In each of the following embodiments, when only a part of a configuration, instead of all of the configuration, is described, the other part of the configuration may have a similar or the equivalent configuration with which is previously described in the foregoing embodiments.

First Embodiment

The following will describe an input apparatus 100 according to a first embodiment of the present disclosure with reference to FIG. 1 to FIG. 4.

As shown in FIG. 1, the input apparatus 100 includes a display unit 110, an input unit 120, and a control unit 130. The display unit 110 displays a graphical user interface (GUI) in a display window 110a of the display unit 110. The input unit 120 inputs an instruction based on a manipulation performed by a user to the control unit 130. The control unit 130 controls the display unit 110 to display the GUI based on the instruction transmitted from the input unit 120.

The display unit 110 may be provided by a liquid crystal display unit and the like. The display unit 110 displays function items 111 in the display window 110a. Each function item 111 is displayed in the display window 110a as a button image. That is, each function item 111 has a button shape. Thus, the function items 111 are also referred to as buttons 111 hereinafter. The buttons 111 are randomly arranged in the display window 110a along at least one of a horizontal direction and a vertical direction, which is perpendicular to the horizontal direction in the display window 110a. As shown in FIG. 1, the buttons 111 are arranged regularly in the horizontal direction. At the same time, the buttons 111 are arranged randomly in the vertical direction such as in a staggered manner. For example, a leftmost button 111 in a first line is arranged near a left portion of a window frame 110b of the display window 110a. A leftmost button 111 in a second line is arranged apart from the left portion of the window frame 110b. A leftmost button 111 in a third line is arranged more apart from the left portion of the window frame 110b compared with the leftmost button 111 in the second line. A leftmost button 111 in a fourth line is arranged more apart from the left portion of the window frame 110b compared with the leftmost button 111 in the third line. A leftmost button 111 in a fifth line is arranged near the left portion of the window frame 110b in a similar way to the leftmost button 111 in the first line. The buttons 111 are not arranged in an outside region of the window frame 110b. Thus, the outside region of the window frame 110b is defined as a non-button region 110c.

Figure 2:
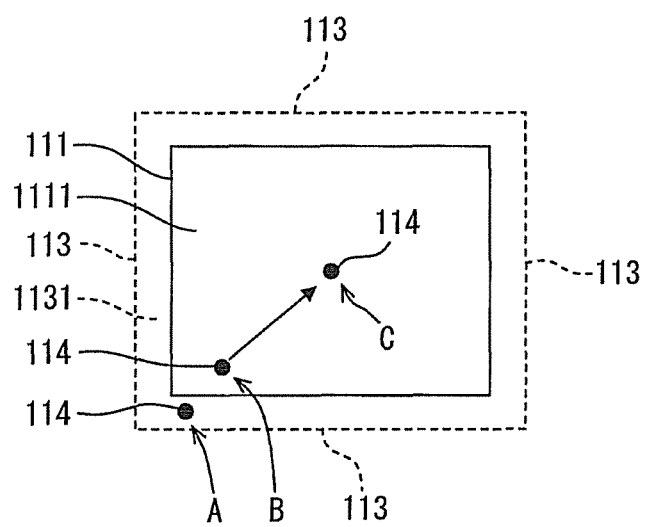
FIG. 2 is a diagram showing a withdrawal movement of a pointer in an input apparatus according to a first embodiment.
Figure 4:
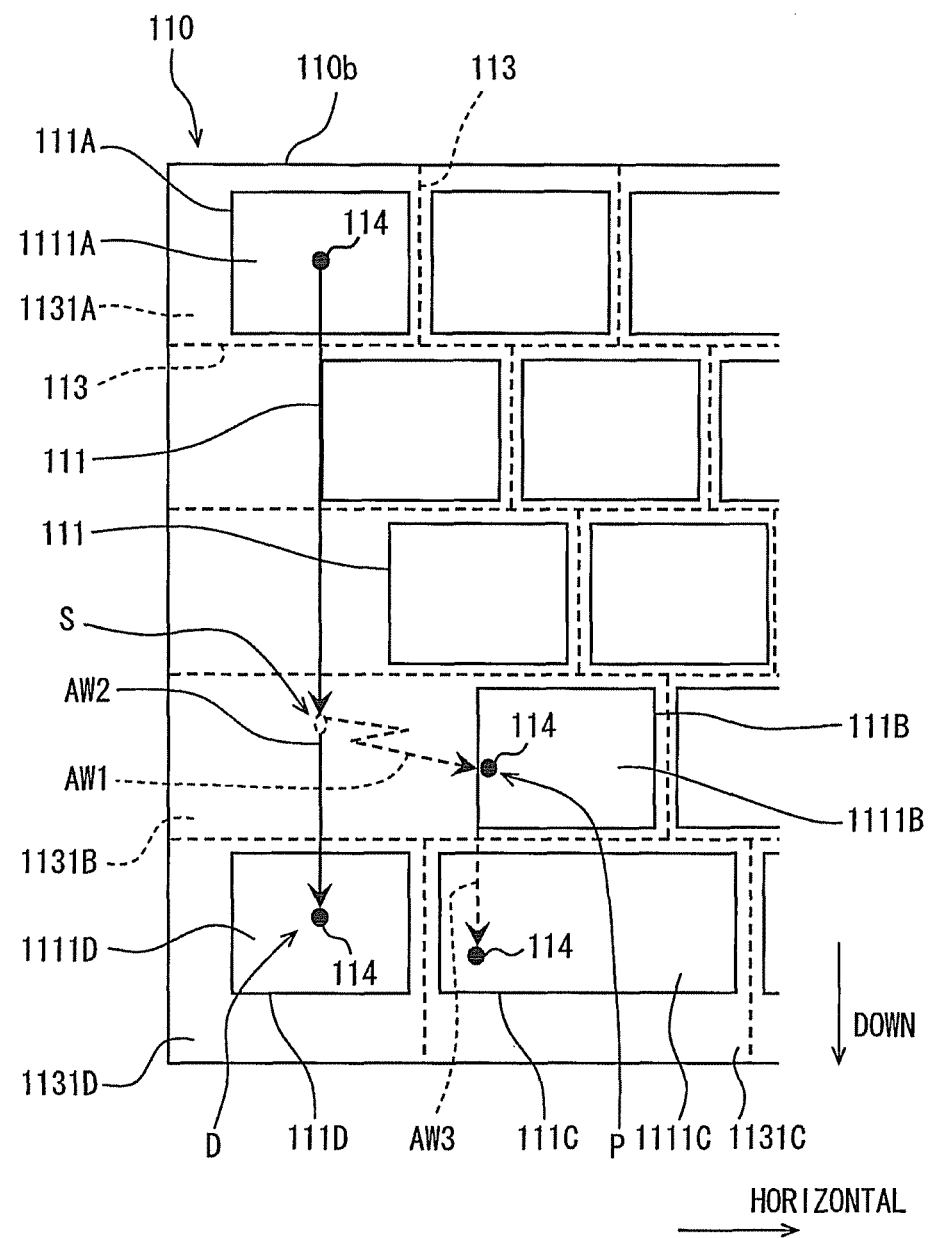
FIG. 4 is a diagram showing a movement of the pointer in the input apparatus according to the first embodiment.

Each button 111 is assigned a predetermined program. When a predetermined selection manipulation of a button 111 and a predetermined determination manipulation of the selected button 111 are performed, the predetermined program assigned to the selected button 111 is executed. Herein, the predetermined selection manipulation refers to a manipulation performed by the user with a finger on a surface of the input unit 120 to select a target button 111. Specifically, a pointer 114 moves based on a slide of the finger on the surface of the input unit 120 to select the target button 111. The predetermined determination manipulation refers to a manipulation performed by the user with the finger on the surface of the input unit 120 to determine the target button 111. Specifically, the target button 111 may be determined by pressing the finger on the surface of the input unit 120. The predetermined selection manipulation and the predetermined determination manipulation are described later in detail. As shown in FIG. 1, FIG. 2, and FIG. 4, each button 111 may have a rectangular shape. Further, a shape of each button 111 and the number of the buttons 111 are not limited to the shape of each button 111 and the number of the buttons 111 shown in FIG. 1, FIG. 2, and FIG. 4.

As shown in FIG. 1, when a button 111 arranged at an upper right portion of the display window 110a is selected by the user, a periphery portion of the selected button 111 is lighted up to notify the user that the button 111 is selected via a visual cognition. The periphery portion of the selected button 111, which has a frame shape, operates as a cursor 112.

Each button 111 has a corresponding button region 1111, which is defined at an inside region of an outline of the button shape as shown in FIG. 1, FIG. 2, and FIG. 4. In the non-button region 110c, which is an outside region of the outline of the button shape, boundary lines 113 are positioned such that each button 111 is surrounded by the boundary lines 113. Each boundary line 113 is an imaginary line, which is invisible to the user. A region defined between the boundary lines 113 and the outline of the corresponding button 111 is referred to as a selection region 1131. As shown in FIG. 1, a selection region 1131 of the leftmost button 111 in the second line may be extended to the left portion of the window frame 110b. Similarly, a selection region 1131 of the leftmost button 111 in the third line may be extended to the left portion of the window frame 110b and may have a larger area than the selection region 1131 of the leftmost button 111 in the second line. Similarly, a selection region 1131 of the leftmost button 111 in the fourth line may be extended to the left portion of the window frame 110b and may have a larger area than the selection region 1131 of the leftmost button 111 in the third line. Each selection region 1131 displayed in the display window 110a of the display unit 110 is defined between the boundary lines 113 and the outline of the corresponding button 111, and is invisible to the user.

The input unit 120 may be provided by a touchpad or a pointing device and the like. The pointer 114 in the display window 110a of the display unit 110 is controlled to move based on the slide of the finger on the surface of the input unit 120. The pointer 114 may be an imaginary pointer, which is invisible to the user, or an actual pointer, which is visible to the user. When the pointer 114 enters a button region 1111 or a selection region 1131 of the target button 111, the target button 111 is set to a selected state. That is, the target button 111 is selected. Further, when the user presses the surface of the input unit 120 with the finger in the selected state, the target button 111 in the selected state is set to a determined state.

The control unit 130 may be provided by a computer at least including a central processing unit (CPU), a main storage media, and a sub storage media. The CPU executes a calculation process and a control process. The main storage media may include a read-only memory (ROM) and a random access memory (RAM), and stores programs and data. The sub storage media may be provided by a hard disk device and the like. The control unit 130 controls the pointer 114 to move in the display window 110a based on position information of the pointer 114, which is transmitted from the input unit 120. The position information indicates the slide of the finger on the surface of the input unit 120.

In the present embodiment, an equivalent stop state is defined as a state in which the pointer 114 moves at a speed lower than a predetermined speed. The equivalent stop state includes an actual stop state in which the speed of the pointer 114 is zero. Hereinafter, a position at which the pointer 114 is set to the equivalent stop state is also referred to as a stop state position. When the pointer 114 is set to the equivalent stop state in the display window 110a, the control unit 130 calculates coordinates of the pointer 114 to be displayed in the display window 110a based on the stop state position.

Figure 3:
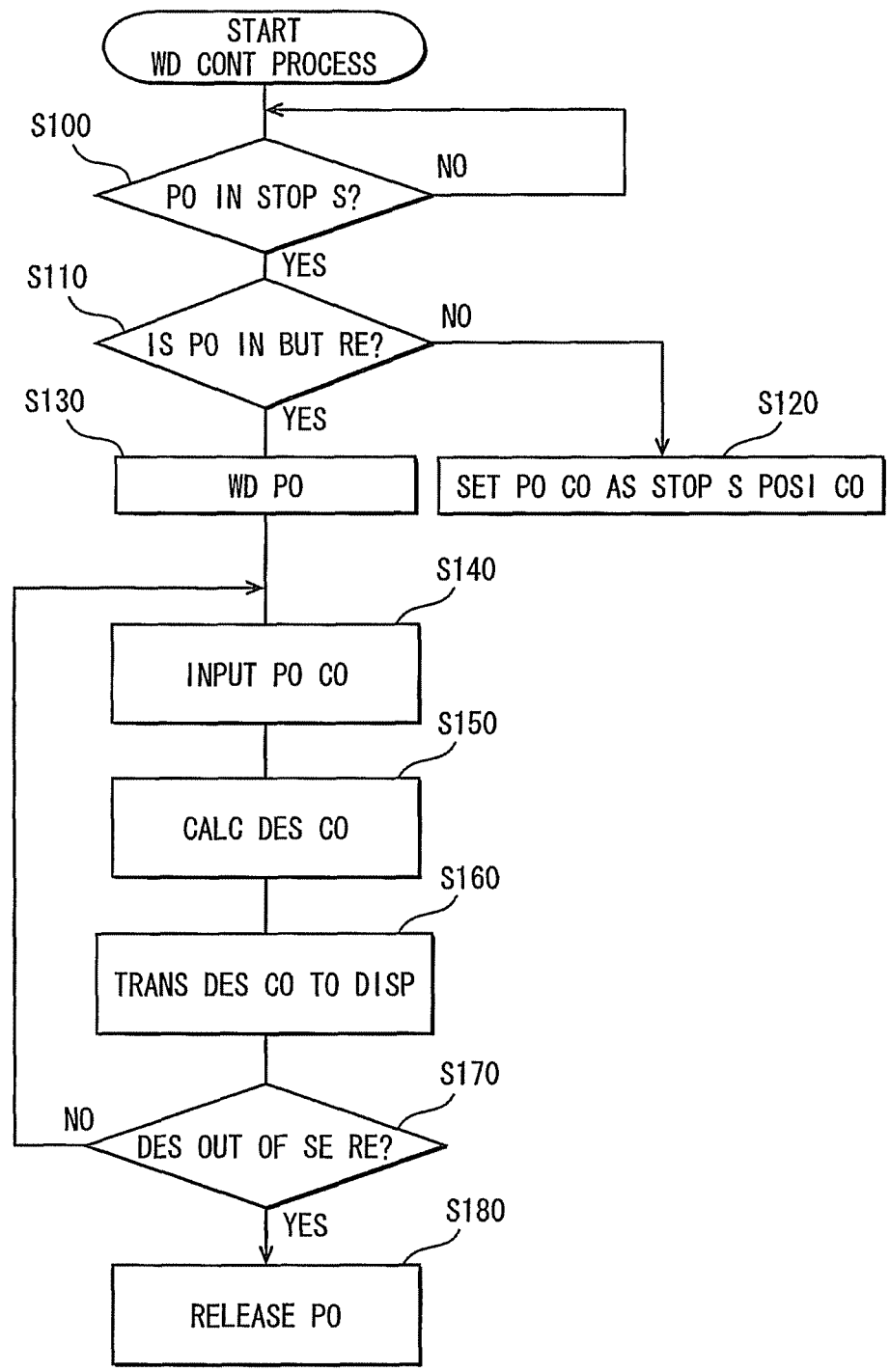
FIG. 3 is a flowchart showing a control process to the pointer in the input apparatus according to the first embodiment.

The following will describe a withdrawal control process executed by the control unit 130 to control the pointer 114 with reference to FIG. 3. At S100, the control unit 130 determines whether the pointer 114 is set to the equivalent stop state. When the control unit 130 determines that the pointer 114 is set to the equivalent stop state, at S110, the control unit 130 further determines whether the pointer 114 is positioned in a button region 1111.

At S110, when the control unit 130 determines that the pointer 114 is not positioned in the button region 1111 (S110: NO), that is the pointer 114 is positioned in a selection region 1131, at S120, the control unit 130 sets the coordinates of the pointer 114 in the display window 110a as coordinates of the stop state position. For example, as shown in FIG. 2, when the pointer 114 is determined to be set to the equivalent stop state at a position A, the stop state position is position A. Thus, the coordinates of the pointer 114 in the display window 110a are set as coordinates of the position A.

At S110, when the control unit 130 determines that the pointer 114 is positioned in the button region 1111 (S110: YES), at S130, the control unit 130 moves the pointer 114 to a predetermined position of the button region 1111. In this case, a movement of the pointer 114 to the predetermined position of the button region 1111 is also referred to as a withdrawal, and a state in which the pointer 114 is positioned at the predetermined position is referred to as a withdrawal state. The predetermined position of the button region 1111 may be a center position C of the button region 1111.

When the pointer 114 moves again from the predetermined position of the button region 1111 to a destination position, at S140, the position information of the destination position of the pointer 114 is transmitted to the control unit 130. That is, the control unit 130 receives the position information of the pointer 114 from the input unit 120. At S150, the control unit 130 calculates coordinates of the destination position of the pointer 114. At S160, the control unit 130 transmits the calculated coordinates of the destination position of the pointer 114 to the display unit 110.

At S170, the control unit 130 determines whether the destination position of the pointer 114 is out of the selection region 1131. At S170, when the control unit 130 determines that the destination position of the pointer 114 is in the selection region 1131, the control process returns to S140. Then S140 to S170 are repeatedly executed until the control unit 130 determines that the destination position of the pointer 114 is out of the selection region 1131.

At S170, when the control unit 130 determines that the destination position of the pointer 114 is out of the selection region 1131, at S180, the control unit 130 unlocks the withdrawal state of the pointer 114 in the button region 1111. That is, the control unit 130 releases the pointer 114. Then, the control process returns to the start of the control process.

The following will describe a movement of the pointer 114 during the control process with reference to FIG. 4. As shown in FIG. 4, four buttons 111A, 111B, 111C, 111D are used to describe the movement of the pointer 114. The button 111A has a button region 1111A and a selection region 1131A. The button 111B has a button region 1111B and a selection region 1131B. The button 111C has a button region 1111C and a selection region 1131C. The button 111D has a button region 1111D and a selection region 1131D.

In a case shown in FIG. 4, the user moves the pointer 114 from the button 111A to the button 111D passing through the buttons 111 positioned between the button 111A and the button 111D to select the target button 111D. According to the conventional input apparatus, in a case where the user moves the pointer 114 from the button 111A to the selection region 1131B of the button 111B passing through the buttons 111 positioned in the second line and the third line, and sets the pointer 114 to the equivalent stop state at a position S in the selection region 1131B of the button 111B, the pointer 114 moves to a predetermined position P of the button region 1111B as shown by a dashed arrow AW1. After the pointer 114 is moved to the predetermined position P of the button region 1111B, when the user further slides the finger in a downward direction (DOWN) to select the target button 111D, the pointer 114 moves in the downward direction and enters the button region 1111C of the button 111C as shown by a dashed arrow AW3. Under this state, when the user performs the predetermined determination manipulation, the button 111C is determined. Thus, the wrong button 111C other than the target button 111D is selected and determined in the conventional input apparatus.

In the input apparatus 100 according to the present embodiment, when the pointer 114 is set to the equivalent stop state in the selection region 1131B of the button 111B, the pointer 114 does not move to the predetermined position P of the button region 1111B. That is, the pointer 114 is maintained at the position S, which is the stop state position. When the user further slides the finger in the downward direction, the pointer 114 moves in the downward direction as shown by a solid arrow AW2 toward the target button 111D. When the user performs the predetermined determination manipulation after the pointer 114 enters the button region 1111D of the target button 111D, the target button 111D is selected and determined.

As described above, when the pointer 114 is set to the equivalent stop state in the selection region 1131 of the corresponding button 111, the control unit 130 cancels a withdrawal of the pointer 114 and sets the coordinates of the pointer 114 in the display window 110a as the coordinates of the stop state position as described in S120 of FIG. 3. Thus, when the user moves the pointer 114 again to pass through other buttons 111, the pointer 114 is avoided to carelessly enter a button region 1111 of another button 111. Thus, a wrong selection by a wrong predetermined selection manipulation and a wrong determination by a wrong predetermined determination manipulation to the target button 111 are reduced. That is, a wrong input to the input unit 120 is reduced.

Further, when the pointer 114 is set to the equivalent stop state in the button region 1111 of the corresponding button 111, the control unit 130 moves the pointer 114 to the predetermined position of the button region 1111. Specifically, the movement of the pointer 114 is achieved by setting the coordinates of the pointer 114 as the coordinates of the predetermined position of the button region 1111. Herein, the predetermined position is set as the center position C of the button region 1111. Thus, when the predetermined determination manipulation is performed to the target button 111 after the target button 111 is selected, the target button 111 is determined with certain even when the pointer 114 is displaced due to a shake of the finger during the predetermined determination manipulation. Thus, the input apparatus 100 according to the present embodiment reduces a wrong input during performing the predetermined determination manipulation to the target button 111.

In the present embodiment, the predetermined position to where the pointer 114 is moved or withdrawn is set as the center position C of the button region 1111. Further, the predetermined position may be set as a position other than the center position C such as a position near the center position C or a position placed an upper portion of the button region 1111.

Second Embodiment

Figure 5:
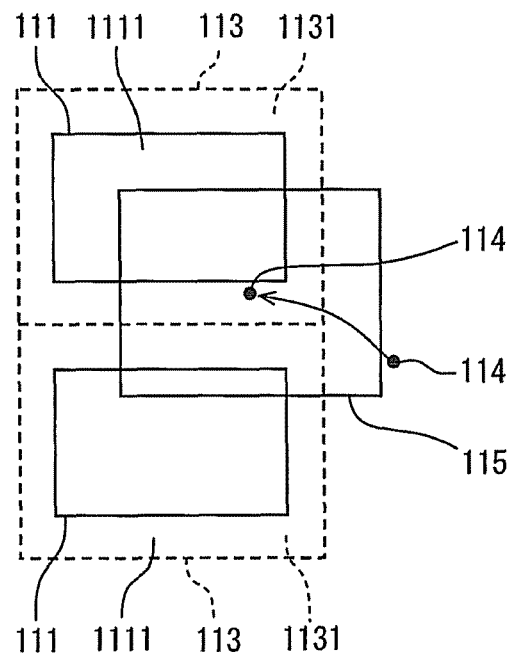
FIG. 5 is a diagram showing a lock of coordinates of a pointer in an input apparatus according to a second embodiment.
Figure 6:
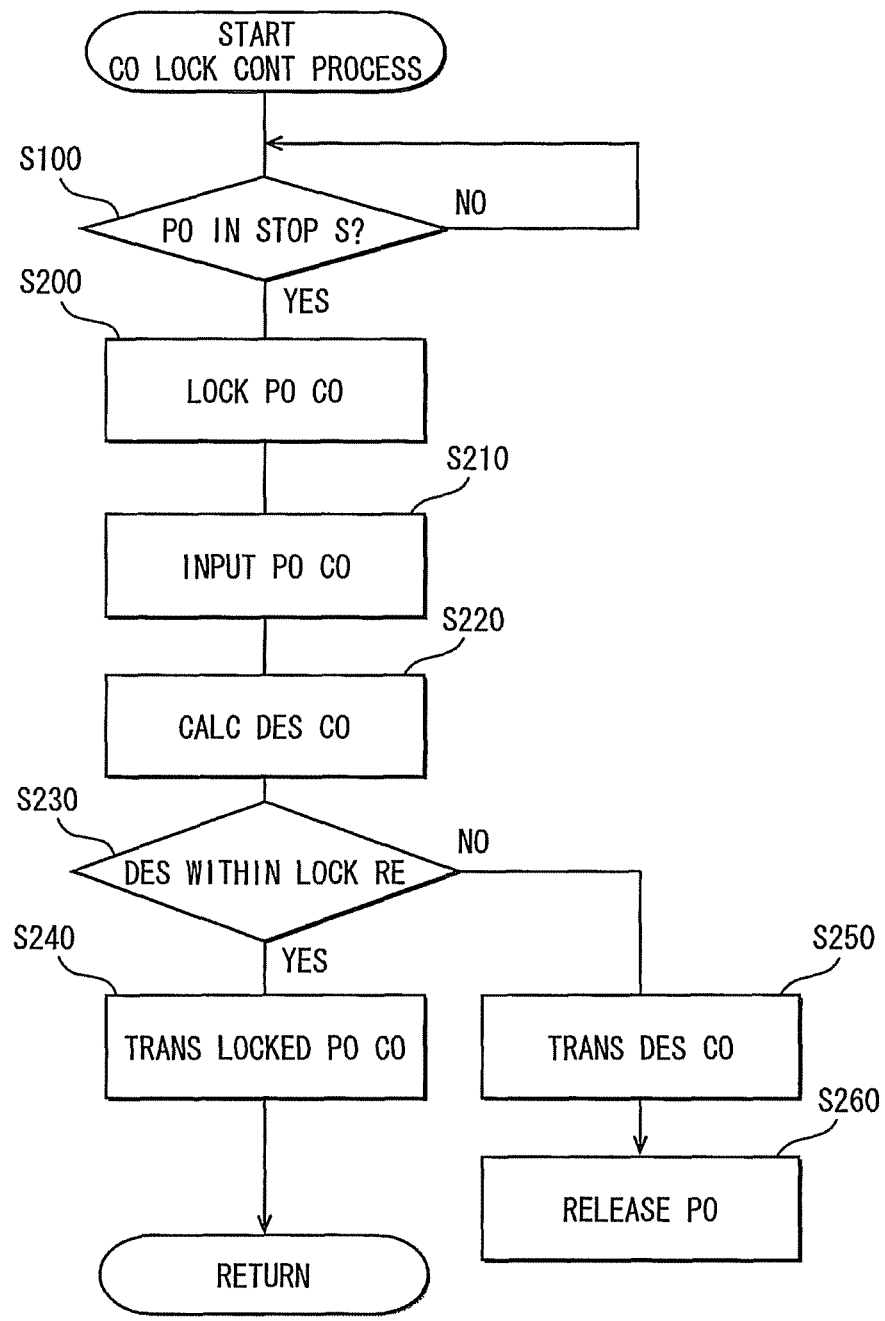
FIG. 6 is a flowchart showing a control process to the pointer in the input apparatus according to the second embodiment.

The following will describe an input apparatus 100 according to a second embodiment of the present disclosure with reference to FIG. 5 and FIG. 6. In the input apparatus 100 according to the present embodiment, a lock region 115 is defined to control the coordinates of the pointer 114.

As shown in FIG. 5, when the pointer 114 is set to the equivalent stop state, the control unit 130 defines the lock region 115 based on a reference position. Herein, the reference position of the lock region 115 is the stop state position of the pointer 114. In the present embodiment, the lock region 115 is defined such that the stop state position of the pointer 114 is located at a center position of the lock region 115. As shown in FIG. 5, when the stop state position of the pointer 114 is in the selection region 1131 or in the button region 1111 (not shown), the lock region 115 is defined based on the stop state position of the pointer 114. The lock region 115 may have a, for example, rectangular shape similar to the button 111. Further, the lock region 115 may be defined in another manner such that the stop state position of the pointer 114 is located at a position other than the center position of the lock region 115.

The following will describe a control process, which is executed by the control unit 130 to lock the coordinates of the pointer 114 with reference to FIG. 6. As shown in FIG. 6, at S100, the control unit 130 determines whether the pointer 114 is set to the equivalent stop state. When the control unit 130 determines that the pointer 114 is set to the equivalent stop state, at S200, the control unit 130 locks the coordinates of stop state position of the pointer 114. At this time, the control unit 130 defines the lock region 115 around the pointer 114 based on the coordinates of stop state position of the pointer 114 so that the pointer 114 is located at the center position of the lock region 115.

When the pointer 114 moves again from the equivalent stop state to a destination position, at S210, the position information of the destination position of the pointer 114 is transmitted to the control unit 130. That is, the control unit 130 receives the position information of the destination position of the pointer 114. At S220, the control unit 130 calculates coordinates of the destination position of the pointer 114.

At S230, the control unit 130 determines whether the destination position of the pointer 114 is in the lock region 115. At S230, when the control unit 130 determines that the destination position of the pointer 114 is in the lock region 115, at S240, the control unit 130 transmits the coordinates of the stop state position of the pointer 114 to the display unit 110. That is, the control unit 130 transmits the coordinates of the stop state position of the pointer 114 to the display unit 110 when the pointer 114 is positioned in the lock region 115. Thus, the control unit 130 transmits the coordinates of the stop state position of the pointer 114 even when the pointer 114 is being moved within the lock region 115. In this case, the coordinates of the stop state position of the pointer 114 are set as coordinates of the center position of the lock region 115. Then, the control process returns to S210.

At S230, when the control unit 130 determines that the destination position of the pointer 114 is out of the lock region 115, at S250, the control unit 130 transmits coordinates of the destination position of the pointer 114 to the display unit 110. In this case, the coordinates of the pointer 114 in the display window 110*a* are set as actual coordinates of the destination position of the pointer 114. At S260, the control unit 130 unlocks the coordinates of the stop state position of the pointer 114. That is, the control unit 130 releases the pointer 114. Then, the control process ends.

Thus, when the pointer 114 moves again from the stop state position within the lock region 115, the coordinates of the pointer 114 in the display window 110*a*, which are set as the coordinates of the reference position of the lock region 115, are locked. Herein, the reference position of the lock region 115 is the stop state position of the pointer 114 in the display window 110*a*. Thus, when the user performs the predetermined determination manipulation after the target button 111 is selected, the target button 111 is determined with certain even when the pointer 114 is displaced due to a shake of the finger during the predetermined determination manipulation. Thus, the input apparatus 100 according to the present embodiment reduces a wrong input during performing the predetermined determination manipulation to the target button 111.

Further, when the pointer 114 moves again from the stop state position to a destination position, which is positioned out of the lock region 115, the coordinates of the pointer 114 are set as the coordinates of the destination position of the pointer 114. Thus, in this case, the coordinates of the pointer 114 in the display window 110*a* are set as actual coordinates of the destination position of the pointer 114. Thus, when the pointer 114 moves out of the lock region 115, the coordinates of the stop state position of the pointer 114 are unlocked, and the actual coordinates of the destination position of the pointer 114 are transmitted to the display unit 110.

Third Embodiment

Figure 7:
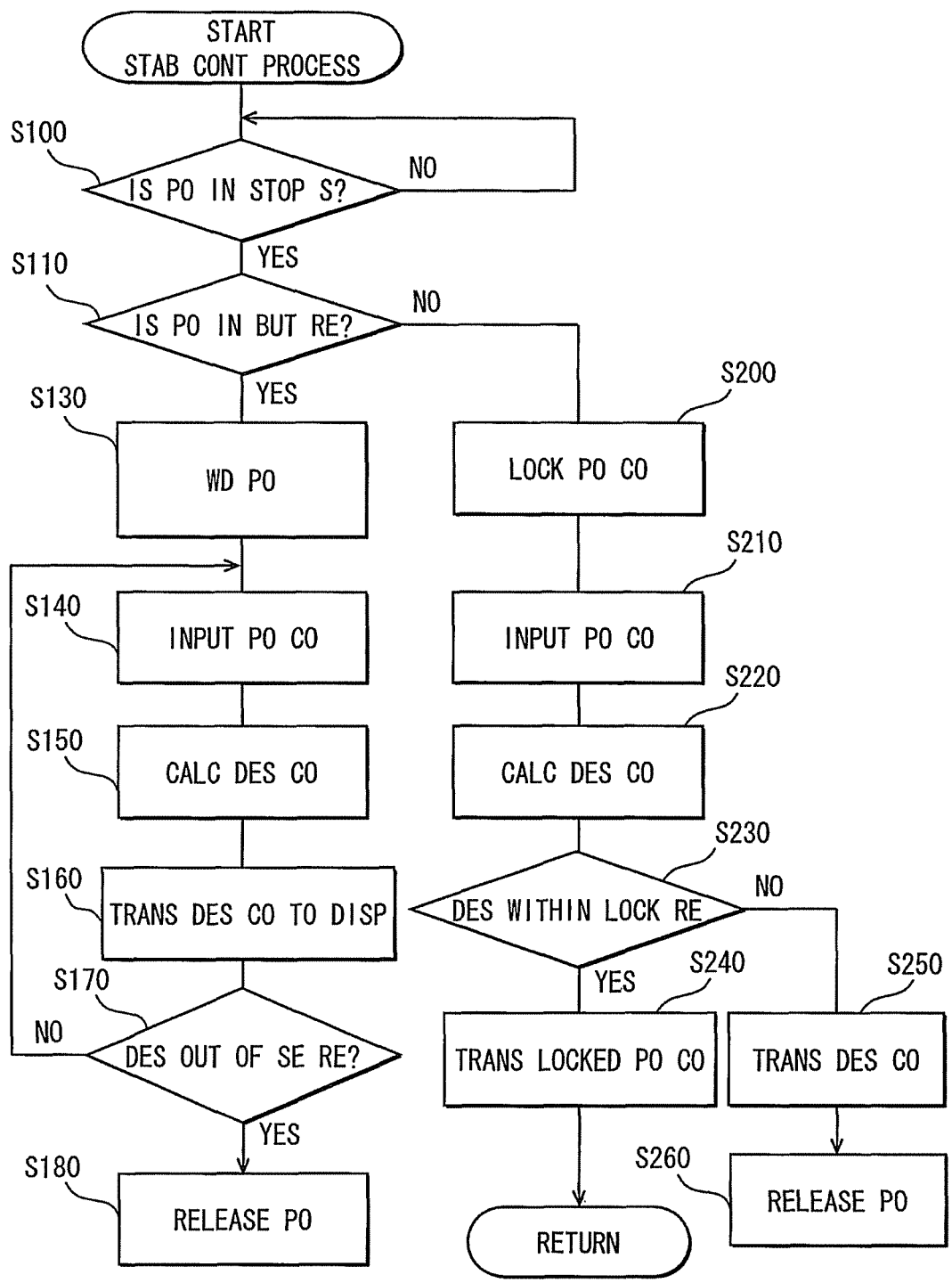
FIG. 7 is a flowchart showing a control to a pointer in an input apparatus according to a third embodiment.

The following will describe an input apparatus 100 according to a third embodiment of the present disclosure with reference to FIG. 7. The input apparatus 100 according to the present embodiment is a combination of the input apparatus 100 according to the first embodiment and the input apparatus 100 according to the second embodiment.

The following will describe a control process, which is executed by the control unit 130 to stabilize the coordinates of the pointer 114 with reference to FIG. 7. As shown in FIG. 7, when the control unit 130 determines that the pointer 114 is set to the equivalent stop state at S100 and further determines that the pointer 114 is positioned in the button region 1111 at S110, the control unit 130 moves the pointer 114 to the predetermined position of the button region 1111 as described at S130 to S180 in FIG. 3.

Further, when the control unit 130 determines that the pointer 114 is not positioned in the button region 1111 at S110 (S110: NO), that is, the control unit 130 determines that the pointer 114 is positioned in the selection region 1131, the control unit 130 locks the coordinates of the stop state position of the pointer 114 as described at S200 to S260 in FIG. 6. In this case, the lock region 115 is defined based on the stop state position of the pointer 114 in the selection region 1131. The lock region 115, which is defined to lock the coordinates of the stop state position of the pointer 114, is also referred to as a first lock region.

With above-described configuration, when the pointer 114 is set to the equivalent stop state in the button region 1111, the pointer 114 is moved to the predetermined position of the button region 1111 and the coordinates of the pointer 114 in the display window 110*a* are set as the coordinates of the predetermined position of the button region 1111. Thus, when the user performs the predetermined determination manipulation after the target button 111 is selected, the target button 111 is determined with certain even when the pointer 114 is displaced due to a shake of the finger during the predetermined determination manipulation. Thus, the input apparatus 100 according to the present embodiment reduces a wrong input during performing the predetermined determination manipulation to the target button 111.

Further, when the pointer 114 is set to the equivalent stop state in the selection region 1131, the coordinates of the pointer 114 in the display window 110a are set as the coordinates of the stop state position of the pointer 114, which is positioned in the selection region 1131. That is, the coordinates of the pointer 114 are locked until the pointer 114 moves out of the lock region 115, which is defined based on the stop state position of the pointer 114. In this case, the lock region 115 is defined so that the stop state position of the pointer 114 is located at the center position of the lock region 115. Thus, the coordinates of the pointer 114 in the display window 110a are locked even when the pointer 114 moves within the lock region 115. With this configuration, a different button 111 near the target button 111 is avoided to be selected by a wrong selection manipulation. Thus, a wrong determination is reduced by avoiding a wrong selection manipulation.

Further, when (i) the pointer 114 is set to the equivalent stop state out of the button region 1111, that is, in the selection region 1131, and (ii) the pointer 114 moves again from the stop state position to a destination position positioned outside of the lock region 115, the coordinates of the pointer 114 in the display window 110a are set as the actual coordinates of the destination position of the pointer 114. With this configuration, the coordinates of the stop state position of the pointer 114, which has been locked, are unlocked when the pointer 114 moves out of the lock region 115. That is, the pointer 114 is released. Thus, the actual coordinates of the pointer 114 can be set as the coordinates of the destination position.

Fourth Embodiment

Figure 8:
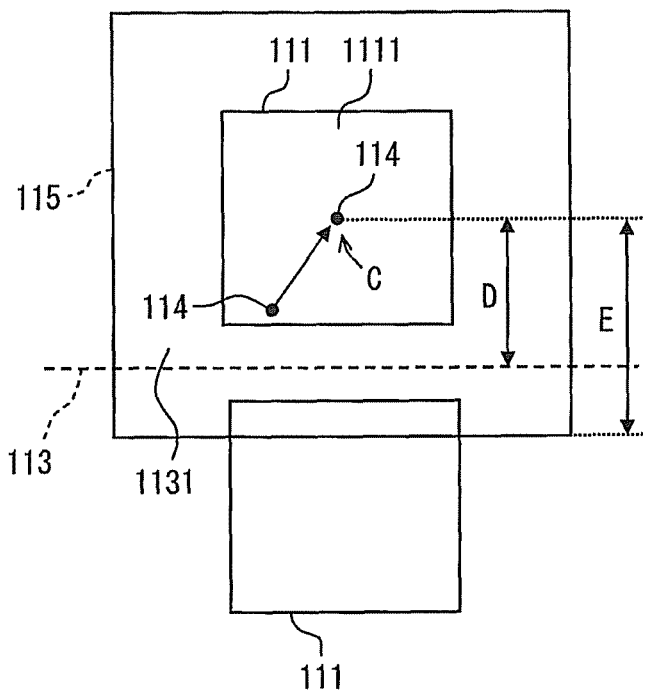
FIG. 8 is a diagram showing a control to a pointer in an input apparatus according to a fourth embodiment.

The following will describe an input apparatus 100 according to a fourth embodiment of the present disclosure with reference to FIG. 8. In the input apparatus 100 according to the present embodiment, the coordinates of the pointer 114 in the display window 110a are set based on the button region 1111 and the lock region 115. In the present embodiment, the lock region 115 used to lock the coordinates of the pointer 114 is also referred to as a second lock region 115.

When the pointer 114 is set to the equivalent stop state in the button region 1111, the control unit 130 moves the pointer 114 to the predetermined position of the button region 1111 as described in the first embodiment. In this case, the predetermined position of the button region 1111 is the center position of the button region 1111. Then, the control unit 130 defines the second lock region 115 based on the stop state position of the pointer 114, which is the center position of the button region 1111. A size of the second lock region 115 is defined larger than a size of the selection region 1131.

When the pointer 114 moves again from the stop state position to a destination position, which is positioned in the second lock region 115, the control unit 130 maintains the coordinates of the stop state position of the pointer 114 displayed on the display window 110a. That is, when the destination position is in the second lock region 115, the coordinates of the pointer 114 are maintained as the coordinates of the stop state position (center position C) of the second lock region 115. Further, when the destination position is out of the second lock region 115, the control unit 130 sets the coordinates of the pointer 114 as the actual coordinates of the destination position.

As described above, when the pointer 114 is set to the equivalent stop state in the button region 1111, the pointer 114 is moved to the center position C of the button region 1111 by the control unit 130. Then, the second lock region 115 having the size larger than the size of the selection region 1131 is defined around the pointer 114. The coordinates of the pointer 114 in the display window 110a are set as the coordinates of the center position C of the second lock region 115 until the pointer 114 moves out of the second lock region 115.

With above-described configuration, a permissible displacement range of the pointer 114 due to the shake of the finger is increased. Specifically, as shown in FIG. 8, when only the button region 1111 is defined, the permissible displacement range of the pointer 114 is range D. In the input apparatus 100 according to the present embodiment, the permissible displacement range of the pointer 114 is increased to range E by defining the second lock region 115. Thus, when the user performs the predetermined determination manipulation after the target button 111 is selected, the target button 111 is determined with certain even when the pointer 114 is displaced due to a shake of the finger during the predetermined determination manipulation. Thus, the input apparatus 100 according to the present embodiment reduces a wrong input during performing the predetermined determination manipulation to the target button 111.

Further, when the pointer 114 moves again from the stop state position to the destination position out of the second lock region 115, the coordinates of the pointer 114 in the display window 110a are set as the actual coordinates of the destination position. Thus, the coordinates of the pointer 114 in the equivalent stop state are unlocked, and the actual coordinates of the pointer 114 are transmitted to the display unit 110 when the pointer 114 moves out of the second lock region 115.

Fifth Embodiment

Figure 9:
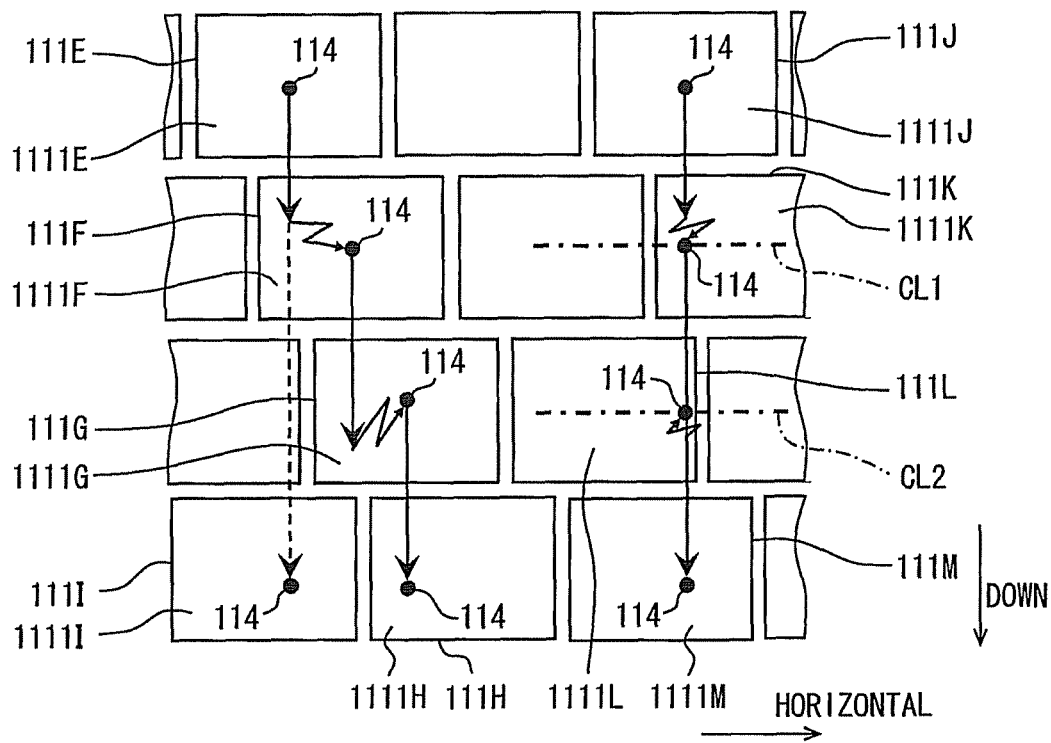
FIG. 9 is a diagram showing a movement of a pointer in an input apparatus according to a fifth embodiment.

The following will describe an input apparatus 100 according to a fifth embodiment of the present disclosure with, reference to FIG. 9. In the input apparatus 100 according to the present embodiment, the predetermined position to where the pointer 114 is moved is set differently from the first embodiment.

As shown in FIG. 9, in the input apparatus 100 according to the present embodiment, the buttons 111 are arranged in a manner similar to an arrangement of buttons of a keyboard of a computer. Specifically, the buttons 111 are arranged in multiple lines in an arrangement direction. Herein, the arrangement direction is the horizontal direction. In the vertical direction, which is perpendicular to the arrangement direction, the buttons 111 are randomly arranged other than a linear arrangement. The vertical direction is also referred to as a perpendicular arrangement direction.

The pointer 114 moves based on an input performed by the user to the input unit 120. For example, when the pointer 114 is set to the equivalent stop state in the button region 1111, the control unit 130 moves the pointer 114 to the predetermined position of the button region 1111. In the present embodiment, the predetermined position of the button region 1111 is set such that the predetermined position is located at a position other than the center position of the button region 1111. In the button region 1111, a first imaginary line (CL), which passes through a center position of the button region 1111 in the horizontal direction and a second imaginary line, which passes through the stop state position of the pointer 114 in the vertical direction are defined. Further, the predetermined position of the button region 1111 is defined at a crossover position of the first imaginary line and the second imaginary line in the button region 1111

The following will describe a movement of the pointer 114 during a control process executed by the control unit 130 of the input apparatus 100 according to the present embodiment with reference to FIG. 9. As shown in FIG. 9, nine buttons 111E, 111F, 111G, 111H, 111I, 111J, 111K, 111L, 111M are used to describe the movement of the pointer 114. The buttons 111E, 111F, 111G, 111H, 111I, 111J, 111K, 111L, 111M have button regions 1111E, 1111F, 1111G, 1111H, 1111I, 1111J, 1111K, 1111L, 1111M, respectively. As shown in a movement of the pointer 114 from the button 111E to the button 111I, when the pointer 114 is set to the equivalent stop state in the button region 1111F of the button 111F, the pointer 114 is moved to a center position of the button region 1111F as described in the first embodiment. Further, as shown in a movement of the pointer 114 from the button 111J to the button 111M, when the pointer 114 is set to the equivalent stop state in the button region 1111K of the button 111K, the pointer 114 is moved to a crossover position of a first imaginary CL1 of the button region 1111K and a second imaginary line, which passes through the stop state position of the pointer 114 in the vertical direction.

FIG. 9 shows a first case in which the user moves the finger from the button 111E to the button 111I to select the target button 111I and a second case in which the user moves the finger from the button 111J to the button 111M to select the target button 111M. As shown in the movement of the finger from the button 111E to the button 111I, when the user sets the pointer 114 to the equivalent stop state in the button region 1111F of the button 111F, the pointer 114 is moved to the center position of the button region 1111F. After the pointer 114 is moved to the center position of the button region 1111F, when the pointer 114 moves again in the downward direction, the pointer 114 enters the button region 1111G of the button 111G. When the pointer 114 is set to the equivalent stop state in the button region 1111G, the pointer 114 is moved to a center position of the button region 1111G. After the pointer 114 is moved to the center position of the button region 1111G, when the pointer 114 moves again in the downward direction, the pointer 114 enters the button region 1111H of the button 111H. When the user performs the predetermined determination manipulation under this state, the button 111H is determined instead of the target button 111I. As described above, in a case where the buttons 111 are arranged randomly other than a linear manner in the vertical direction, when the pointer 114 is set to the equivalent stop state during the movement, the pointer 114 is moved to a center position of a corresponding button region 1111 in which the pointer 114 is set to the equivalent stop state. Thus, in the horizontal direction, the position of the pointer 114 is gradually moved in one direction. That is, in the horizontal direction, the position of the pointer 114 is gradually moved to a left direction, or gradually moved to a right direction. Thus, the button 111H other than the target button 111I is selected and determined. Accordingly, a wrong input is performed with above described configuration.

In the input apparatus 100 according to the present embodiment, as shown in the movement of the pointer 114 from the button 111J to the button 111M, when the pointer 114 is set to the equivalent stop state, the pointer 114 is moved to a crossover position of a first imaginary line of a button region 1111 in which the pointer 114 is set to the equivalent stop state and a second imaginary line, which passes through the stop state position of the pointer 114 in the vertical direction. Specifically, when the pointer 114 is set to the equivalent stop state in the button region 1111K of the button 111K, the pointer 114 is moved to a crossover position of a first imaginary line CL1 of the button region 1111K and a second imaginary line, which passes through the stop state position of the pointer 114 in the vertical direction. Further, when the pointer 114 is set to the equivalent stop state again in the button region 1111L of the button 111L, the pointer 114 is moved to a crossover position of a first imaginary line CL2 of the button region 1111L and a second imaginary line, which passes through the stop state position of the pointer 114 in the vertical direction. With above-described configuration, the pointer 114 is not moved in the horizontal direction in the button region 1111K and the button region 1111L. That is, the pointer 114 is not displaced in the horizontal direction during the movement from the button 111J to the button 111M. Thus, the target button 111M can be selected and determined by moving the pointer 114 in the downward direction from the button 111J and performing the predetermined determination manipulation.

As described above, in the input apparatus 100 according to the present embodiment, the pointer 114 only moves in the perpendicular arrangement direction, which is perpendicular to the arrangement direction of the buttons 111. Thus, the pointer 114 is not displaced in the arrangement direction in which the buttons 111 are arranged. Thus, the pointer 114 is moved straightly in the perpendicular arrangement direction, which is perpendicular to the arrangement direction of the buttons 111. With this configuration, a target button 111 arranged at a forward side in the perpendicular arrangement direction, is easy to be selected and determined.

Sixth Embodiment

Figure 10:
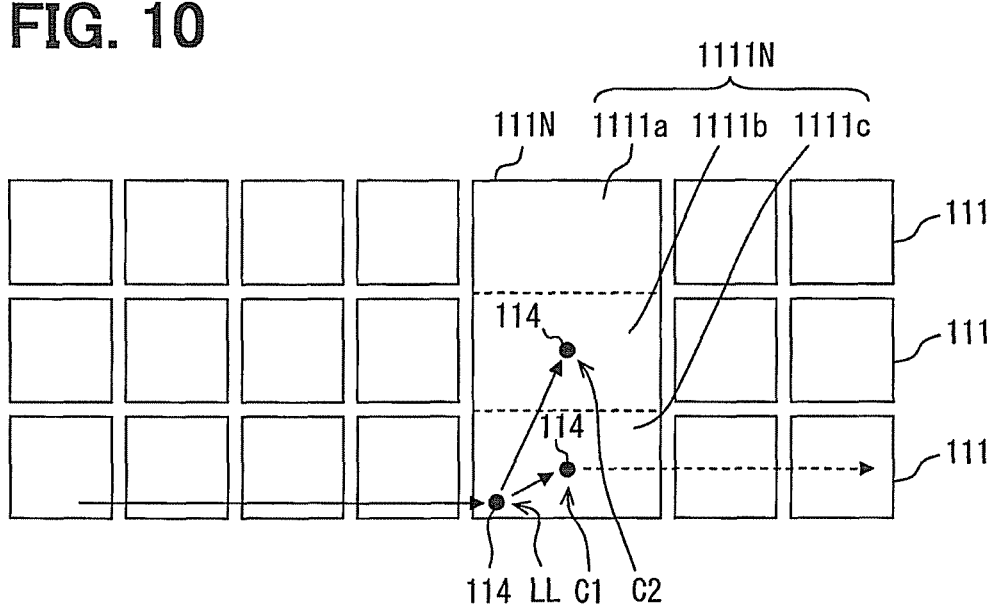
FIG. 10 is a diagram showing a control to a pointer in an input apparatus according to a sixth embodiment.

The following will describe an input apparatus 100 according to a sixth embodiment of the present disclosure with reference to FIG. 10. In the input apparatus 100 according to the present embodiment, a button region 1111N of a specific button 111N is divided into multiple sub button regions 1111a, 1111b, 1111c, and the pointer 114 is moved to the predetermined position of the button region 1111N in a different manner compared with the foregoing embodiments.

As shown in FIG. 10, in the input apparatus 100 according to the present embodiment, the buttons 111 are arranged in multiple lines in an arrangement direction. Herein, the arrangement direction is the horizontal direction. That is, the buttons 111 are arranged in the linear manner in the horizontal direction. The specific button 111N arranged in the linear manner in the horizontal direction has a vertical width larger than vertical widths of other buttons 111. Hereinafter, the specific button 111N having the vertical width larger than the vertical widths of other buttons 111 is also referred to as a large button 111N. The large button 111N may be arranged in an intermediate position of other buttons 111 in the horizontal direction. Further, the large button 111N may be arranged in an end position in the horizontal direction. Further, the button region 1111N of the large button 111N is divided into multiple sub button regions 1111a, 1111b, and 1111c. The sub button regions 1111a, 1111b, 1111c are divided corresponding to the lines in which the buttons 111 are arranged in the horizontal direction. Thus, the sub button regions 1111a, 1111b, 1111c are arranged in the vertical direction.

As shown in FIG. 10, in a case where the pointer 114 is set to the equivalent stop state at a left lower position LL of the sub button region 1111c of the button region 1111N, the pointer 114 is moved to a center position C1 of the sub button region 1111c when an elapsed time after the pointer 114 is set to the equivalent stop state is shorter than a predetermined time period. In this case, the center position C1 of the sub button region 1111c is also referred to as a first predetermined position.

Further, in the case where the pointer 114 is set to the equivalent stop state at the left lower position LL of the sub button region 1111c of the button region 1111N, the pointer 114 is moved to a center position C2 of the button region 1111N of the large button 111N when the elapsed time after the pointer 114 is set to the equivalent stop state is longer than the predetermined time period. In this case, the center position C2 of the button region 1111N of the large button 111N is also referred to as a second predetermined position.

When the elapsed time after the pointer 114 is set to the equivalent stop state is shorter than the predetermined time period, the pointer 114 is predicted to be in a moving state. In this case, the predetermined position is set to the center position C1 of the sub button region 1111c. Thus, when the pointer 114 moves again along a line in which the buttons 111 are arranged from the stop state position, a displacement of the pointer 114 in the vertical direction is reduced. In FIG. 10, the line corresponding to the stop state position of the pointer 114 is a bottom line in the display window 110a.

When the elapsed time after the pointer 114 is set to the equivalent stop state is longer than the predetermined time period, the large button 111N is predicted to be selected by the pointer 114 and to be determined by performing the predetermined determination manipulation. In this case, the predetermined position of the button region 1111N is set to the center position C2 of the button region 1111N. Thus, the large button 111N is selected and determined with certain.

Seventh Embodiment

Figure 11:
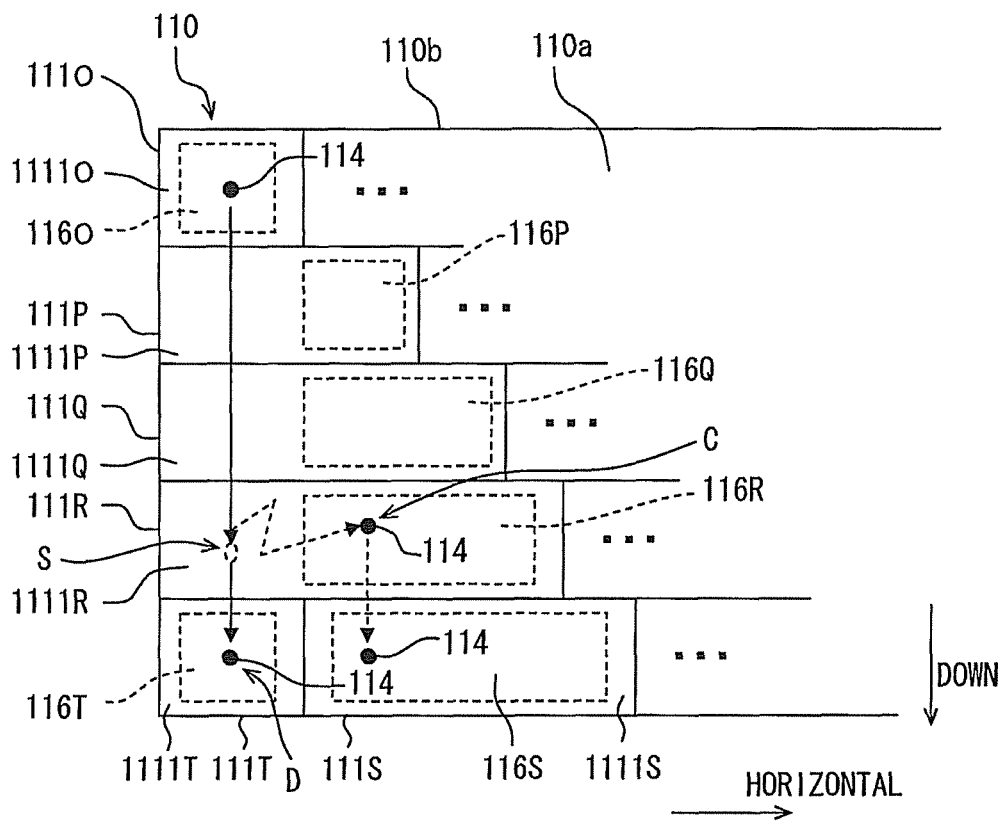
FIG. 11 is a diagram showing a control to a pointer in an input apparatus according to a seventh embodiment.

The following will describe an input apparatus 100 according to a seventh embodiment of the present disclosure with reference to FIG. 11. In the input apparatus 100 according to the present embodiment, each button 111 is arranged in contacted with one another without the non-button region 110c described in the foregoing embodiments.

As shown in FIG. 11, outlines of buttons 111O, 111P, 111Q, 111R, 111S, 111T are contacted with outlines of adjacent buttons 111O, 111P, 111Q, 111R, 111S, 111T. Thus, the non-button region 110c described in the first embodiment is not defined in the present embodiment. The buttons 111O, 111P, 111Q, 111R, 111S, 111T are arranged in multiple lines in an arrangement direction, and are randomly arranged other than the linear manner in a perpendicular arrangement direction, which is perpendicular to the arrangement direction. In the present embodiment, the arrangement direction is defined as the horizontal direction, and the perpendicular arrangement direction is defined as the vertical direction. As shown in FIG. 11, the leftmost button 111O in the first line is arranged in contact with the left portion of the window frame 110b of the display window 110a. The leftmost button 111P in the second line has a horizontal width larger than a horizontal width of the leftmost button 111O in the first line. The leftmost button 111Q in the third line has a horizontal width larger than the horizontal width of the leftmost button 111P in the second line. The leftmost button 111R in the fourth line has a horizontal width larger than the horizontal width of the leftmost button 111Q in the third line. The leftmost button 111R in the fifth line has a horizontal width equal to the horizontal width of the leftmost button 111O in the first line.

The buttons 111O, 111P, 111Q, 111R, 111S, 111T have button regions 1111O, 1111P, 1111Q, 1111R, 1111S, 1111T, respectively. Further, the buttons 111O, 111P, 111Q, 111R, 111S, 111T have inside regions 116O, 116P, 116Q, 116R, 116S, 116T, respectively. The inside regions 116 are arranged inside of the respective button regions 1111. When the pointer 114 enters the button region 1111 or the inside region 116 of the target button 111, the target button 111 is determined to be selected.

With above described arrangement of the buttons 111 in the display window 110a, the inside regions 116P, 116Q, 116R of the buttons 111P, 111Q, 111R are respectively disposed at right portions of the button regions 1111P, 1111Q, 1111R. Thus, sizes of the button regions 1111P, 1111Q, 1111R of the buttons 111P, 111Q, 111R are larger than sizes of the button regions 1111O, 1111T of the buttons 111O, 111T.

When the control unit 130 determines that the pointer 114 is set to the equivalent stop state, the control unit 130 further determines whether the pointer 114 is positioned in the button region 1111.

When the control unit 130 determines that the pointer 114 is positioned in the button region 1111 other than the inside region 116, the control unit 130 sets the coordinates of the pointer 114 in the display window 110a as the coordinates of the stop state position.

Further, when the control unit 130 determines that the pointer 114 is positioned in the inside region 116, the control unit 130 sets the coordinates of the pointer 114 in the display window 110a as coordinates of a predetermined position of the button region 1111. In this case, the predetermined position may be set as, for example, a center position of the button region 1111. Hereinafter, the predetermined position of the button region 1111 is also referred to as a first predetermined position of the button region 1111.

The following will describe a movement of the pointer 114 during a control process executed by the control unit 130 of the input apparatus 100 according to the present embodiment with reference to FIG. 11. FIG. 11 shows a case in which the user moves the finger from the button 111O to the button 111T to select the target button 111T. In the conventional input apparatus, when the user moves the pointer 114 from the button 111O to the button 111R passing through the buttons 111P, 111Q, and sets the pointer 114 to the equivalent stop state at a position S included in the button region 1111R of the button 111R, the pointer 114 is moved to the predetermined position such as a center position C of the button region 1111R of the button 111R. As shown in FIG. 11, in the conventional input apparatus, the pointer 114 is moved to the center position C of the button region 1111R, which is included in the inside region 116R of the button region 1111R. Further, when the user moves the pointer 114 in the downward direction to select the target button 111T, the pointer 114 enters the button region 1111S of the button 111S. Under this state, when the user performs the predetermined determination manipulation, the button 111S instead of the target button 111T is determined. Thus, a wrong selection of the button 111S other than the target button 111T is performed, and determined thereby causing a wrong input.

In the input apparatus 100 according to the present embodiment, when the pointer 114 is set to the equivalent stop state at the position S included in the button region 1111R of the button 111R, the pointer 114 is maintained at the stop state position S without a movement to the predetermined position of the button region 1111R until the pointer 114 moves out of the button region 1111R. Thus, when the pointer 114 is further moved in the downward direction, the pointer 114 enters the button region 1111T of the target button 111T as shown in FIG. 11. Thus, the target button 111T is selected and determined with certain.

As described above, in the input apparatus 100 according to the present embodiment, when the pointer 114 is positioned at the position S included in the button region 1111, the control unit 130 sets the coordinates of the pointer 114 in the display window 110a as the coordinates of the stop state position S. Thus, when the pointer 114 moves again from the stop state position S passing through other buttons 111, the pointer 114 is avoided to be carelessly moved to an inside region 116 of another button 111. Thus, a wrong selection by the predetermined selection manipulation to the button 111 and a wrong input by the predetermined determination manipulation to the button 111 are reduced.

Further, when the pointer 114 is set to the equivalent stop state in the inside region 116 of the corresponding button 111, the control unit 130 sets the coordinates of the pointer 114 in the display window 110a as the coordinates of the predetermined position of the button region 1111. In the present embodiment, the predetermined position of the button region 1111 is defined as the center position of the button region 1111. Thus, when the user performs the predetermined determination manipulation after the target button 111 is selected, the target button 111 is determined with certain even when the pointer 114 is displaced due to a shake of the finger during the predetermined determination manipulation. Thus, the input apparatus 100 according to the present embodiment reduces a wrong input during performing the predetermined determination manipulation to the target button 111.

Further, the input apparatus 100 according to the present embodiment may have a configuration described in each of the input apparatuses 100 described in the second to the sixth embodiment. When the input apparatus 100 according to the present embodiment has a configuration described in one of the input apparatuses 100 described in the second to the sixth embodiment, the button region 1111 in the present embodiment corresponds to the selection region 1131 described in the second to the sixth embodiment, and the inside region 116 in the present embodiment corresponds to the button region 1111 described in the second to the sixth embodiment. When the input apparatus 100 according to the present embodiment has a configuration described in each of the input apparatuses 100 described in the second to the sixth embodiment, advantages, which are similar to advantages provided by the input apparatuses 100 described in the second to the sixth embodiment, are provided.

Other Embodiments

In each of the input apparatuses 100 according to the first embodiment to the sixth embodiment, when an elapsed time after the pointer 114 is set to the equivalent stop state is longer than a predetermined time, the control unit 130 may set the coordinates of the pointer 114 in the display window 110a as coordinates of a second predetermined position of the button region 1111. The second predetermined position is positioned at a different position from the first predetermined position in the button region 1111. In the present embodiment, the first predetermined position is set as the center position C of the button region 1111. Further, the second predetermined position may also be set at the same position with the first predetermined position. Further, in the input apparatus 100 according to the seventh embodiment, when the elapsed time after the pointer 114 is set to the equivalent stop state is longer than the predetermined time, the control unit 130 may set the coordinates of the pointer 114 in the display window 110a as coordinates of a second predetermined position of the button region 1111. The second predetermined position is positioned at a different position from the first predetermined position. Further, the second predetermined position may also be set at the same position with the first predetermined position.

In each of the input apparatuses 100 according to the first embodiment to the seventh embodiment, when the elapsed time after the pointer 114 is set to the equivalent stop state is longer than the predetermined time period, the button 111 corresponding to the pointer 114 is determined to be selected by the pointer 114 and the button 111 corresponding to the pointer 114 is predicted to be determined by performing the predetermined determination manipulation. Thus, in this case, the coordinates of the pointer 114 in the display window 110a are set as the coordinates of the second predetermined position of the button region 1111 of the corresponding button 111. With this configuration, the target button 111 is determined with certain.

Further, in each of the input apparatuses 100 according to the first embodiment to the seventh embodiment, during the predetermined determination manipulation, the control unit 130 may set the coordinates of the pointer 114 in the display window 110a as the coordinates of the second predetermined position of the button region 1111.

With above-described configuration, during the predetermined determination manipulation, the coordinates of the pointer 114 in the display window 110a are set as the coordinates of the second predetermined position of the button region 1111 of the corresponding button 111. Thus, the target button 111 is determined with certain even when the pointer 114 is displaced due to a shake of the finger during the predetermined determination manipulation.

In each of the input apparatuses 100 according to the foregoing embodiments, the input apparatus 100 includes the display unit 110. Further, the display unit 110 may be provided by an external display unit other than the display unit 110 included in the input apparatus. When the input apparatus uses the external display unit as the display unit 110, the external display unit has functions similar to the display unit 110 of the input apparatus 100 disclosed in the present disclosure.

In an embodiment of the present disclosure, an input apparatus includes a display unit, an input unit, and a control unit. The display unit displays a plurality of function items on a display window of the display unit. Each function item has a button shape. The input unit selects one of the function items and determines the one of the function items with a pointer. The pointer moves in the display window to select the one of the function items based on a predetermined selection manipulation and determines the one of the function items based on a predetermined determination manipulation. The one of the function items selected and determined by the pointer is referred to as a subject function item. The control unit controls a movement of the pointer in the display window by setting coordinates of the pointer based on position information of the pointer. The position information is transmitted from the input unit. Each of the function items includes a button region, which is defined at an inside region of an outline of the button shape, and a selection region, which is defined around the button region at an outside region of the outline of the button shape. The subject function item includes a subject button region and a subject selection region. When the pointer moves to at least one of the subject button region and the subject selection region of the subject function item, the subject function item is selected. When the pointer is set to an equivalent stop state in the subject selection region, the control unit sets the coordinates of the pointer in the display window as coordinates of a position at which the pointer is set to the equivalent stop state. The position at which the pointer is set to the equivalent stop state is referred to as a stop state position, and the equivalent stop state refers to a state in which the pointer moves at a speed lower than a predetermined speed. With this configuration, when the pointer moves again from the stop state position passing through other function items, the pointer is avoided to carelessly enter another button region other than the subject button region. Further, when the pointer is set to the equivalent stop state in the subject button region, the control unit sets the coordinates of the pointer in the display window as coordinates of a predetermined position of the subject button region. Thus, when the predetermined determination manipulation is performed to the subject function item after the subject function item is selected, the subject function item is determined with certain even when the pointer is displaced due to a shake of the finger during the predetermined determination manipulation. Thus, the input apparatus reduces a wrong input during performing the predetermined determination manipulation to the subject function item.

Further, when the pointer is set to the equivalent stop state in the subject selection region, the control unit may define a first lock region based on a reference position, which is the stop state position. When the pointer moves again from the stop state position to a destination position, which is positioned inside of the first lock region, the control unit may reset the coordinates of the pointer in the display window as coordinates of the reference position of the first lock region. That is, the coordinates of the pointer in the display window are locked. Thus, another function item positioned near the subject function item is avoided to be carelessly selected by avoiding a wrong selection. Further, when the pointer moves again from the stop state position to a destination position, which is positioned outside of the first lock region, the control unit may reset the coordinates of the pointer in the display window as coordinates of the destination position. That is, the lock of the coordinates of the pointer is released thereby setting the actual coordinates of the pointer.

Further, when the pointer is set to the equivalent stop state in the subject button region, the control unit may set the coordinates of the pointer in the display window as the coordinates of the predetermined position of the subject button region, and may define a second lock region based on a reference position, which is the predetermined position of the subject button region. The second lock region may have a size larger than a size of the subject selection region. When the pointer moves again from the predetermined position of the subject button region to a destination position, which is positioned inside of the second lock region, the control unit may reset the coordinates of the pointer in the display window as coordinates of the reference position of the second lock region. That is, the coordinates of the pointer in the display window are locked. Thus, when the user performs the predetermined determination manipulation after the subject function item is selected, the subject function item is determined with certain even when the pointer is displaced due to a shake of the finger during the predetermined determination manipulation. Thus, a wrong input during performing the predetermined determination manipulation is reduced. Further, when the pointer moves again from the predetermined position of the subject button region to a destination position, which is positioned outside of the second lock region, the control unit may reset the coordinates of the pointer in the display window as coordinates of the destination position. Thus, a lock to the coordinates of the pointer in the display window is released thereby setting the actual coordinates of the pointer.

Further, the predetermined position of the subject button region may be a center position of the subject button region. With this configuration, the pointer is moved to the center position of the subject button region, and a selection to the subject function item is performed with certain. Further, when the user performs the predetermined determination manipulation after the subject function item is selected, the subject function item is determined with certain even when the pointer is displaced due to a shake of the finger during the predetermined determination manipulation.

Further, the function items may be arranged in at least one line along an arrangement direction. A direction perpendicular to the arrangement direction may be referred to as a perpendicular arrangement direction. The subject function item may include a first imaginary line, which passes through a center position of the subject function item in the arrangement direction and a second imaginary line, which passes through the stop state position in the perpendicular arrangement direction. The predetermined position of the subject button region may be a crossover position of the first imaginary line and the second imaginary line. With this configuration, the pointer is moved only in the perpendicular arrangement direction, and a displacement of the pointer in the arrangement direction is avoided. Thus, a wrong selection to the subject function item is reduced.

Further, the function items may include at least one specific button having a specific button region, which is divided into a plurality of sub button regions. When the pointer is set to the equivalent stop state in one of the sub button regions, the control unit may reset the coordinates of the pointer in the display window as coordinates of a predetermined position of the one of the sub button regions. The one of the sub button regions in which the pointer is set to the equivalent stop state may be referred to as a subject sub button region. The predetermined position of the subject sub button region may be a center position of the subject sub button region. With this configuration, when the pointer moves again from the predetermined position of the subject sub button region, another subject function item, which is positioned substantially apart from the predetermined position of the subject sub button region, is avoided to be selected by the pointer.

Further, when the pointer is set to the equivalent stop state in the subject button region, the control unit sets the coordinates of the pointer in the display window as the coordinates of the predetermined position of the subject button region. The predetermined position may be referred to as a first predetermined position. When an elapsed time after the pointer is set to the equivalent stop state is longer than a predetermined time period, the control unit may reset the coordinates of the pointer in the display window as coordinates of a second predetermined position of the subject button region. The second predetermined position may be positioned at a different position from the first predetermined position in the subject button region. With this configuration, when the elapsed time after the pointer is set to the equivalent stop state is longer than the predetermined time period, the subject function item is determined to be selected by the pointer and is predicted to be determined based on the predetermined determination manipulation. Thus, the coordinates of the pointer in the display window are reset as the coordinates of the second predetermined position of the subject button region With this configuration, the subject function item is determined with certain.

Further, when the pointer is set to the equivalent stop state in the subject button region, the control unit may set the coordinates of the pointer in the display window as the coordinates of the predetermined position of the subject button region, which is referred to as a first predetermined position. When the predetermined determination manipulation is performed after the subject button is set to the equivalent stop state, the control unit may reset the coordinates of the pointer in the display window as coordinates of a second predetermined position of the subject button region, which is positioned at a different position from the first predetermined position. With this configuration, during the predetermined determination manipulation, the coordinates of the pointer in the display window are set as the coordinates of the second predetermined position of the subject button region. Thus, the subject function item is determined with certain even when the pointer is displaced due to a shake of the finger during the predetermined determination manipulation.

In another embodiment of the present disclosure, when the pointer is set to the equivalent stop state, the control unit defines a lock region based on a reference position, which is the stop state position. When the pointer moves again from the stop state position to a destination position, which is positioned inside of the lock region, the control unit resets the coordinates of the pointer in the display window as coordinates of the reference position of the lock region. That is, the coordinates of the pointer in the display window are locked. Thus, when the user performs the predetermined determination manipulation after the subject function item is selected, the subject function item is determined with certain even when the pointer is displaced due to a shake of the finger during the predetermined determination manipulation. Thus, a wrong input during performing the predetermined determination manipulation to the subject function item is reduced. Further, when the pointer moves again from the stop state position to a destination position, which is positioned outside of the lock region, the control unit resets the coordinates of the pointer in the display window as coordinates of the destination position. Thus, a lock to the coordinates of the pointer is released thereby setting the actual coordinates of the pointer.

In another embodiment of the present disclosure, the function items are arranged in contact with one another. Each of the function items includes a button region, which is defined at an inside region of an outline of the button shape, and the button region includes an inside region, which is defined at an inside region of the button region. The subject function item includes a subject button region and a subject inside region. When the pointer moves to at least one of the subject button region and the subject inside region of the subject function item, the subject function item is selected. When the pointer is set to the equivalent stop state in the subject button region other than the subject inside region, the control unit sets the coordinates of the pointer in the display window as coordinates of a position at which the pointer is set to the equivalent stop state. Thus, when the pointer moves again from the stop state position passing through other function items, the pointer is avoided to be carelessly moved to an inside region of another function item. Thus, a wrong selection to another function item and a wrong input of another function item are reduced. Further, when the pointer is set to the equivalent stop state in the subject inside region, the control unit sets the coordinates of the pointer in the display window as coordinates of a predetermined position of the subject button region. Thus, when the user performs the predetermined determination manipulation after the subject function item is selected, the subject function item is determined with certain even when the pointer is displaced due to a shake of the finger during the predetermined determination manipulation. Thus, a wrong input during performing the predetermined determination manipulation to the subject function item is reduced.

While only the selected exemplary embodiments have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiments according to the present disclosure is provided for illustration only, and not for the purpose of limiting the disclosure as defined by the appended claims and their equivalents.

What is claimed is:

1. An input apparatus comprising:
    a display unit that displays a plurality of function items on a display window of the display unit, each function item having a button shape;
    an input unit that selects one of the function items and determines the one of the function items with a pointer, the pointer moving in the display window to select the one of the function items based on a predetermined selection manipulation and determining the one of the function items based on a predetermined determination manipulation, the one of the function items selected and determined by the pointer being referred to as a subject function item; and
    a control unit that controls a movement of the pointer in the display window by setting coordinates of the pointer based on position information of the pointer, the position information being transmitted from the input unit,
    wherein each of the function items includes a button region, which is defined at an inside region of an outline of the button shape, and a selection region, which is defined around the button region at an outside region of the outline of the button shape,
    wherein, the subject function item includes a subject button region and a subject selection region, and when the pointer moves to at least one of the subject button region and the subject selection region of the subject function item, the subject function item is selected,
    wherein, when the pointer is set to an equivalent stop state in the subject selection region, the control unit sets the coordinates of the pointer in the display window as coordinates of a position at which the pointer is set to the equivalent stop state, the equivalent stop state referring to a state in which the pointer moves at a speed lower than a predetermined speed and the position at which the pointer is set to the equivalent stop state being referred to as a stop state position,
    wherein, when the pointer is set to the equivalent stop state in the subject button region, the control unit sets the coordinates of the pointer in the display window as coordinates of a predetermined position of the subject button region,
    wherein, when the pointer is set to the equivalent stop state in the subject selection region, the control unit defines a first lock region based on a reference position, which is the stop state position, the stop state position is unlocked by movement of the pointer out of the first lock region,
    wherein, when the pointer moves from the stop state position to a destination position, which is positioned inside of the first lock region, the control unit resets the coordinates of the pointer in the display window as coordinates of the reference position of the first lock region, and
    wherein, when the pointer moves from the stop state position to a destination position, which is positioned outside of the first lock region, the control unit resets the coordinates of the pointer in the display window as coordinates of the destination position.

2. The input apparatus according to claim 1,
    wherein, when the pointer is set to the equivalent stop state in the subject button region, the control unit:

sets the coordinates of the pointer in the display window as the coordinates of the predetermined position of the subject button region; and defines a second lock region based on a reference position, which is the predetermined position of the subject button region, the second lock region having a size larger than a size of the subject selection region, wherein, when the pointer moves again from the predetermined position of the subject button region to a destination position, which is positioned inside of the second lock region, the control unit resets the coordinates of the pointer in the display window as coordinates of the reference position of the second lock region, and wherein, when the pointer moves again from the predetermined position of the subject button region to a destination position, which is positioned outside of the second lock region, the control unit resets the coordinates of the pointer in the display window as coordinates of the destination position.

3. The input apparatus according to claim 1, wherein the predetermined position of the subject button region is a center position of the subject button region.

4. The input apparatus according to claim 1, wherein the function items are arranged in at least one line along an arrangement direction, wherein a direction perpendicular to the arrangement direction is referred to as a perpendicular arrangement direction, wherein the subject function item includes a first imaginary line, which passes through a center position of the subject function item in the arrangement direction and a second imaginary line, which passes through the stop state position in the perpendicular arrangement direction, and wherein the predetermined position of the subject button region is a crossover position of the first imaginary line and the second imaginary line.

5. The input apparatus according to claim 1, wherein the function items include at least one specific button, the one specific button including a specific button region, which is divided into a plurality of sub button regions, wherein, when the pointer is set to the equivalent stop state in one of the sub button regions, the control unit sets the coordinates of the pointer in the display window as coordinates of a predetermined position of the one of the sub button regions, the one of the sub button regions in which the pointer is set to the equivalent stop state being referred to as a subject sub button region, and wherein, the predetermined position of the subject sub button region is a center position of the subject sub button region.

6. The input apparatus according to claim 1, wherein, when the pointer is set to the equivalent stop state in the subject button region, the control unit sets the coordinates of the pointer in the display window as the coordinates of the predetermined position of the subject button region, the predetermined position being referred to as a first predetermined position, wherein, when an elapsed time after the pointer is set to the equivalent stop state is longer than a predetermined time period, the control unit resets the coordinates of the pointer in the display window as coordinates of a second predetermined position of the subject button region, and wherein the second predetermined position is positioned at a different position from the first predetermined position in the subject button region.

7. The input apparatus according to claim 1, wherein, when the pointer is set to the equivalent stop state in the subject button region, the control unit sets the coordinates of the pointer in the display window as the coordinates of the predetermined position of the subject button region, the predetermined position being referred to as a first predetermined position, wherein, when the predetermined determination manipulation is performed after the subject button is set to the equivalent stop state, the control unit resets the coordinates of the pointer in the display window as coordinates of a second predetermined position of the subject button region, and wherein the second predetermined position is positioned at a different position from the first predetermined position in the subject button region.

8. An input apparatus comprising:

a display unit that displays a plurality of function items on a display window of the display unit, each function item having a button shape;

an input unit that selects one of the function items and determines the one of the function items with a pointer, the pointer moving in the display window to select the one of the function items based on a predetermined selection manipulation and determining the one of the function items based on a predetermined determination manipulation, the one of the function items selected and determined by the pointer being referred to as a subject function item; and a control unit that controls a movement of the pointer in the display window by setting coordinates of the pointer based on position information of the pointer, the position information being transmitted from the input unit, wherein, when the pointer is set to an equivalent stop state, the control unit defines a lock region based on a reference position, which is a stop state position, the equivalent stop state referring to a state in which the pointer moves at a speed lower than a predetermined speed and the stop state position referring to a position at which the pointer is set to the equivalent stop state, the stop state position is unlocked by movement of the pointer out of the lock region, wherein, when the pointer moves from the stop state position to a destination position, which is positioned inside of the lock region, the control unit resets the coordinates of the pointer in the display window as coordinates of the reference position of the lock region, and wherein, when the pointer moves from the stop state position to a destination position, which is positioned outside of the lock region, the control unit resets the coordinates of the pointer in the display window as coordinates of the destination position.

9. An input apparatus comprising:

a display unit that displays a plurality of function items on a display window of the display unit, each function item having a button shape;

an input unit that selects one of the function items and determines the one of the function items with a pointer, the pointer moving in the display window to select the one of the function items based on a predetermined selection manipulation and determining the one of the function items based on a predetermined determination manipulation, the one of the function items selected and determined by the pointer being referred to as a subject function item; and a control unit that controls a movement of the pointer in the display window by setting coordinates of the pointer based on position information of the pointer, the position information being transmitted from the input unit, wherein the function items are arranged in contact with one another, wherein each of the function items includes a button region, which is defined at an inside region of an outline of the button shape, and the button region includes an inside region, which is defined at an inside region of the button region, wherein the subject function item includes a subject button region and a subject inside region, and when the pointer moves to at least one of the subject button region and the subject inside region of the subject function item, the subject function item is selected, wherein, when the pointer is set to an equivalent stop state in the subject button region other than the subject inside region, the control unit sets the coordinates of the pointer in the display window as coordinates of a stop state position, the equivalent stop state referring to a state in which the pointer moves at a speed lower than a predetermined speed and the stop state position referring to a position at which the pointer is set to the equivalent stop state, wherein, when the pointer is set to the equivalent stop state in the subject inside region, the control unit sets the coordinates of the pointer in the display window as coordinates of a predetermined position of the subject button region, wherein, when the pointer is set to the equivalent stop state in the subject button region, the control unit defines a first lock region based on a reference position, which is the stop state position, the stop state position is unlocked by movement of the pointer out of the first lock region, wherein, when the pointer moves from the stop state position to a destination position, which is positioned inside of the first lock region, the control unit resets the coordinates of the pointer in the display window as coordinates of the reference position of the first lock region, and wherein, when the pointer moves from the stop state position to a destination position, which is positioned outside of the first lock region, the control unit resets the coordinates of the pointer in the display window as coordinates of the destination position.

10. The input apparatus according to claim 9, wherein, when the pointer is set to the equivalent stop state in the subject inside region, the control unit:

sets the coordinates of the pointer in the display window as the coordinates of the predetermined position of the subject button region; and defines a second lock region based on a reference position, which is the predetermined position of the subject button region, the second lock region having a size larger than a size of the subject button region, wherein, when the pointer moves again from the predetermined position of the subject button region to a destination position, which is positioned inside of the second lock region, the control unit resets the coordinates of the pointer in the display window as coordinates of the reference position of the second lock region, and wherein, when the pointer moves again from the predetermined position of the subject button region to a destination position, which is positioned outside of the second lock region, the control unit resets the coordinates of the pointer in the display window as coordinates of the destination position.

11. The input apparatus according to claim 9, wherein the predetermined position of the subject button region is a center position of the subject button region.

12. The input apparatus according to claim 9, wherein the function items are arranged in at least one line along an arrangement direction, wherein a direction perpendicular to the arrangement direction is referred to as a perpendicular arrangement direction, wherein the subject function item includes a first imaginary line, which passes through a center position of the subject function item in the arrangement direction and a second imaginary line, which passes through the stop state position in the perpendicular arrangement direction, and wherein the predetermined position of the subject button region is a crossover position of the first imaginary line and the second imaginary line.

13. The input apparatus according to claim 9, wherein the function items include at least one specific button, the one specific button including a specific inside region, which is divided into a plurality of sub inside regions, wherein, when the pointer is set to the equivalent stop state in one of the sub inside regions, the control unit sets the coordinates of the pointer in the display window as coordinates of a predetermined position of the one of the sub inside regions, the one of the sub inside regions in which the pointer is set to the equivalent stop state being referred to as a subject sub inside region, and wherein, the predetermined position of the subject sub inside region is a center position of the subject sub inside region.

14. The input apparatus according to claim 9, wherein, when the pointer is set to the equivalent stop state in the subject inside region, the control unit sets the coordinates of the pointer in the display window as the coordinates of the predetermined position of the subject button region, the predetermined position being referred to as a first predetermined position, wherein, when an elapsed time after the pointer is set to the equivalent stop state is longer than a predetermined time period, the control unit resets the coordinates of the pointer in the display window as coordinates of a second predetermined position of the subject button region, and wherein the second predetermined position is positioned at a different position from the first predetermined position in the subject button region.

15. The input apparatus according to claim 9, wherein, when the pointer is set to the equivalent stop state in the subject inside region, the control unit sets the coordinates of the pointer in the display window as the coordinates of the predetermined position of the subject button region, the predetermined position being referred to as a first predetermined position, wherein, when the predetermined determination manipulation is performed after the subject button is set to the equivalent stop state, the control unit resets the coordinates of the pointer in the display window as coordinates of a second predetermined position of the subject button region, and wherein the second predetermined position is positioned at a different position from the first predetermined position in the subject button region.

16. The input apparatus according to claim 1,
wherein the predetermined selection manipulation refers to a slide of a finger on a surface of the input unit to select the subject function item, and
wherein the predetermined determination manipulation refers to a press of the finger on the surface of the input unit to determine the subject function item.

17. The input apparatus according to claim 1,
wherein the pointer is an imaginary pointer, which is invisible to a user, or an actual pointer, which is visible to the user.

\* \* \* \* \*